US006410880B1

(12) United States Patent
Putvinski et al.

(10) Patent No.: US 6,410,880 B1
(45) Date of Patent: Jun. 25, 2002

(54) INDUCTION PLASMA TORCH LIQUID WASTE INJECTOR

(75) Inventors: Sergei Putvinski, La Jolla; Stephen F. Agnew, San Diego; Tihiro Ohkawa, La Jolla; Leigh Sevier, Poway, all of CA (US)

(73) Assignee: Archimedes Technology Group, Inc., San Diego, CA (US)

( * ) Notice: Subject to any disclaimer, the term of this patent is extended or adjusted under 35 U.S.C. 154(b) by 0 days.

(21) Appl. No.: 09/480,097

(22) Filed: Jan. 10, 2000

(51) Int. Cl.[7] ................................................ B23K 10/00
(52) U.S. Cl. ............................ 219/121.59; 219/121.52; 219/121.51; 219/121.48; 315/111.51
(58) Field of Search ........................ 219/121.52, 121.37, 219/121.38, 121.36, 121.59, 121.48; 315/111.21, 111.51

(56) References Cited

U.S. PATENT DOCUMENTS

| | | | |
|---|---|---|---|
| 3,722,677 | A | 3/1973 | Lehnert |
| 4,431,901 | A | 2/1984 | Hull |
| 5,560,844 | A | 10/1996 | Boulos |
| 5,611,947 | A | 3/1997 | Vavruska |

FOREIGN PATENT DOCUMENTS

| | | |
|---|---|---|
| WO | WO 97/34685 | 9/1997 |

OTHER PUBLICATIONS

Hrabovsky, Processes and Properties of Electric Arc Stabilized by Water Vortex, pp 833–839, Transactions on Plasma Science, vol. 25, No. 5, Oct. 1997.

Van Der Plas, An Evaluation of Ceramic Materials for Use in Non–Cooled Low–Flow ICP Torches, pp. 1205–1216, Spectrochemical Acta, vol. 42B, 1987.

Van Der Plas, A Radiatively Cooled Torch for ICP–AES Using 1 1 mi–1 of Argon, Spectrochemical Acta, vol. 39B, 1984.

Fauchais, Thermal Plasmas, IEEE Transactions on Plasma Science, vol. 25, No. 6, Dec. 1997.

Mostaghimi, Analysis of an RF Induction Plasma Torch with a Permeable Ceramic Wall, Canadian Journal of Chemical Engineering, vol. 67, Dec. 1989.

Dundas, Titanium Dioxide Production by Plasma Processing, Chemical Engineering Progress, vol. 66, Oct. 1970.

*Primary Examiner*—Mark Paschall
(74) *Attorney, Agent, or Firm*—Nydegger & Associates

(57) ABSTRACT

A plasma torch for vaporizing a molten salt containing a volatile component and a refractory component injects the molten salt into a device that includes a cylindrical shaped outer member and a cylindrical shaped inner member coaxially positioned inside the outer member to surround a chamber. An induction coil positioned between the inner and outer members generates r.f. power which is initially used to vaporize the volatile component of the molten salt to create a carrier gas having an elevated temperature. The carrier gas then heats the refractory component, under an increased vapor pressure from the carrier gas. This action, in turn, breaks down the refractory component of the molten salt into fine droplets. These fine droplets are maintained in the chamber until they also vaporize. In one embodiment, the plasma torch includes a nozzle for spraying droplets of the molten salt into said chamber. In another embodiment, a jet is positioned at the entrance of the chamber to direct the molten salt tangentially onto the inner wall. This creates a film of the molten salt which partially evaporates in the chamber. For this embodiment a diverter is positioned at the exit of the chamber to redirect unevaporated molten salt back to the jet for recycling.

14 Claims, 3 Drawing Sheets

INDUCTION PLASMA TORCH LIQUID WASTE INJECTOR

FIELD OF THE INVENTION

The present invention pertains generally to high frequency Inductively Coupled Plasma (ICP) torches. More specifically, the present invention pertains to ICP torches which minimize the gas feed that is required to initiate and maintain the atomization or vaporization of molten salt materials. The present invention is particularly, but not exclusively, useful as an ICP torch for a molten salt, such as a multi-component nuclear waste slurry, which includes both a volatile component and a refractory component.

BACKGROUND OF THE INVENTION

Various types of ICP torches which can produce high temperature gaseous plasmas for such purposes as plasma etching, evaporation of refractory materials, spectroscopy, sintering waste incineration and mitigation are well known. In large part, the wide range of applications for which ICP torches can be used is due to the fact that these torches are generally capable of producing heat loads in excess of 100 $MW/m^2$ on the surface of small particles or droplets injected in the plasma. Another application, among several, which is attracting new attention is the creation of plasmas for the purposes of remediating the refractory components of nuclear waste. Importantly, it is also well known that even the more sturdy refractory materials, such as are found in nuclear waste, will vaporize under heat loads around 100 $MW/m^2$. The challenge in this case is to attain and maintain such heatloads.

In a typical operation, an ICP torch will produce a plasma by ionizing a gaseous substance with a high frequency RF electromagnetic field (i.e. RF. power). For such operations, the gaseous substance in this case is usually referred to as a carrier gas, and the electromagnetic field is typically produced by an induction coil at frequencies in a general range of 0.4–30 MHz. In any case, the result is a high temperature gas flow having temperatures that reach upward to about 10,000–20,000° K. It happens, however, that the power density that can be generated in an ICP torch is limited by the heating of the side wall of the plasma torch chamber. Thus, the side wall of the torch chamber should have a high heat conductivity to keep the wall temperature at a sufficiently low operational temperature (e.g. significantly below the range of 10,000–20,000° K). At the same time, the side wall should also have a high electrical resistivity to allow for the penetration of an AC electromagnetic field into the plasma chamber.

While the ionization, atomization or vaporization of volatile components can be accomplished using heat loads that are generated at relatively low temperatures (e.g. below 100 $MW/m^2$ and well below the range of 10,000–20,000° K), this is not the case for refractory components. In fact, the vaporization of a refractory component will often require heat loads that are in excess of the 100 $MW/m^2$ mentioned above. Consequently, very high temperatures must be accommodated if refractory components are to be vaporized.

One solution to the high temperature problem has been to cool the wall of a plasma torch with a gas vortex that is created by injecting gas tangentially onto the wall. Although such a procedure may be efficacious for the purpose of cooling the chamber wall, it will also contribute to the throughput of the torch. Further, the total throughput will be increased if a carrier gas is used in the ICP torch along with the cooling gas vortex. In some applications, however, these consequences may present a significant disadvantage. For example, in applications where refractory components need to be vaporized, it may be desirable to minimize the amount of gas in the throughput. Specifically, when refractory components are to be vaporized in a plasma torch, it may be necessary that the resultant plasma be transferred to a vacuum chamber for subsequent processing. In such applications, the efficacy of the subsequent processing and the efficiency of vacuum pumps can only be increased by decreasing the amount of gaseous throughput.

In light of the above, it is an object of the present invention to provide an ICP torch and a method for vaporizing a molten salt that contains both a volatile component and a refractory component wherein the volatile component is initially vaporized to create a carrier gas that will heat the refractory component, which will then be vaporized. Another object of the present invention is to provide an ICP torch and a method for vaporizing a molten salt which reduces the gas-to-waste feed ratio to minimize the gas throughput. Yet another object of the present invention is to provide an ICP torch and a method for vaporizing a molten salt which will control the deposit of condensed vapors inside the chamber of the torch. Still another object of the present invention is to provide an ICP torch and a method for vaporizing a molten salt which is relatively simple to manufacture, is easy to use and is comparatively cost effective.

SUMMARY OF THE PREFERRED EMBODIMENTS

In accordance with the present invention, an inductively coupled plasma torch atomizes a molten salt that contains both a volatile component and a refractory component. More specifically, the molten salt is atomized in the plasma chamber of the plasma torch, in stages. Initially, the plasma torch vaporizes the volatile component of the molten salt to create a carrier gas in the chamber. The torch then uses the heat and pressure that are generated by the carrier gas to promote a subsequent vaporization of the refractory component. The result is a lower gas throughput for the plasma torch. Additionally, the plasma torch is constructed to prevent, or at least minimize, the condensation of molten salt vapors in the chamber that would otherwise adversely affect the operation of the plasma torch.

In the general aspects of its construction, the plasma torch of the present invention includes a cylindrical shaped outer member and a cylindrical shaped inner member that is coaxially positioned inside the outer member. With this configuration, a space is established between the two members. The purpose of this space is actually twofold. First, it is the location for the induction coil which is used to generate r.f. power for the plasma torch. Second, the space also holds a fluid coolant which cools the induction coil, as well as the torch itself. Additionally, the inner member defines an axially elongated chamber.

Depending on the particular mechanism that is used for injecting the molten salt into the chamber, the inner member will be constructed with different configurations. For one embodiment, the inner member will be configured to accommodate a cleaning gas which will enter the chamber and remain near the wall of the inner member. In another embodiment, the inner member is configured to support and carry a film of the molten salt. In either case, the inner wall is constructed to help minimize the gas-to-waste feed ratio and to control deposits on the wall.

In one embodiment of the present invention, the mechanism for injecting the molten salt into the chamber is a nozzle or multiple nozzles. Specifically, the nozzle is designed to spray droplets of the molten salt into the chamber that have diameters which are approximately less than one hundred microns (<100 $\mu$m). Additionally, the injection mechanism for this embodiment can include various passageways for directing a cleaning gas, such as sodium vapor or water vapor, over the inner wall. The main purpose of this cleaning gas is to inhibit, or prevent, the condensation of molten salt vapors on the inner wall.

When a nozzle is used to inject a molten salt into the chamber of the plasma torch, the cylindrical inner wall will include a plurality of elongated, preferably copper, segments. Specifically, each segment is aligned substantially parallel to the axis of the chamber, each segment is juxtaposed between two other segments, and each segment is formed with an axially aligned liquid coolant channel. Further, a spacing plate, that is made of an electrically insulating material, is positioned between each pair of juxtaposed segments. Additionally, each segment is provided with a ceramic shield which is mounted on the segment to interface with the chamber. Preferably, the ceramic shield is made of a refractory material which has a low electrical resistivity and a high thermal shock resistance.

For another embodiment of the present invention, the mechanism for injecting a molten salt into the plasma chamber includes a jet which is positioned at one end of the chamber to direct the molten salt tangentially onto the inner wall. In general, the molten salt is injected onto the inner wall with a tangential velocity ($v_\theta$) that is in a range from about one-half to about two meters per second ($v_\theta$=0.5 to 2 m/sec). Specifically, this is done to create a film of molten salt which will swirl through the chamber on the inner wall. As the molten salt evaporates from the surface of this film, droplets of the molten salt will react with r.f. power from the induction coil in a manner similar to the nozzle version of the present invention as previously described. Unlike the nozzle version, however, the inner wall for this embodiment will need to be relatively smooth in order to reduce turbulence in the flow of the film. Further, for this embodiment, a diverter is positioned at the opposite end of the chamber from the jet to receive the unevaporated molten salt film from the inner wall. The diverter will then remove unevaporated molten salt from the chamber and redirect the unevaporated molten salt back to the jet for recycling.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
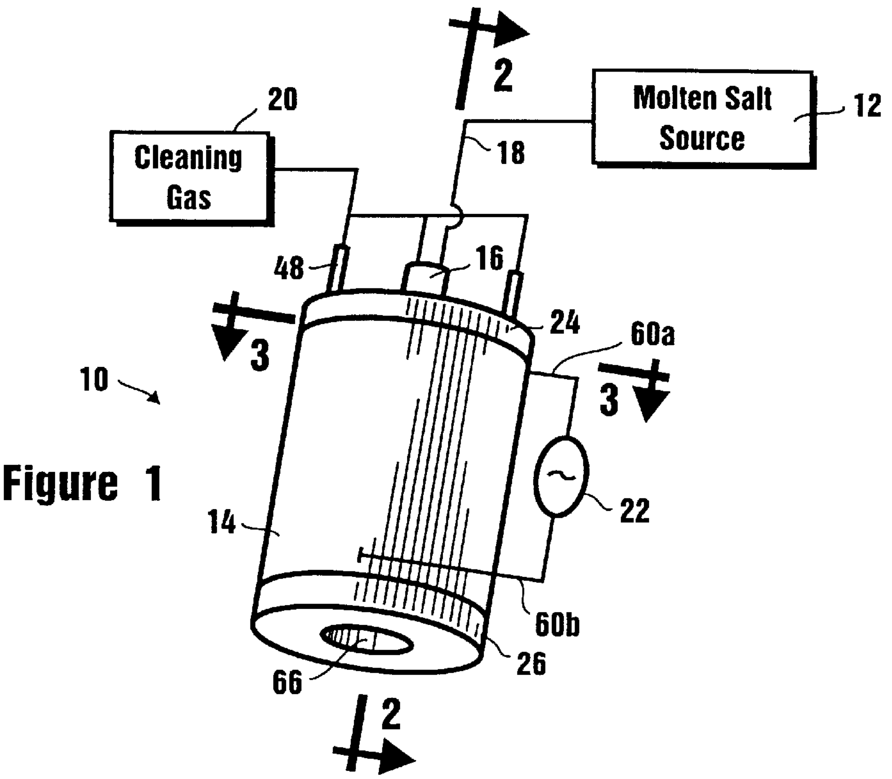
FIG. 1 is a perspective view of one embodiment of the ICP torch of the present invention, with the torch shown schematically in combination with peripheral components.

Referring initially to FIG. 1, one embodiment for an ICP torch in accordance with the present invention is shown and is generally designated 10. A source 12 of the material which is to be vaporized by the torch 10 (e.g. molten salt) is also shown in FIG. 1. As intended for the present invention, the material that is held in the source 12 includes both a volatile component, such as sodium oxide or sodium hydroxide, and a refractory component, such as the refractory metal oxides $Al_2O_3$ or $UO_3$. The present invention, however, is not limited to only the materials mentioned herein. Instead, the present invention contemplates the treatment of many different types of waste streams, including nuclear waste.

In FIG. 1 it will be seen that the torch 10 has a generally cylindrical shaped body member 14 and a nozzle 16 which is mounted at one end of the body member 14. As shown, the nozzle 16 is connected in fluid communication with the molten salt source 12 via the feed line 18. Additionally, FIG. 1 shows that a source 20 of a cleaning (shielding) gas and an RF generator 22 are provided as peripheral equipment. For the purposes of the present invention, the typical operational parameters for the RF generator 22 will be a frequency of about 3 MHz, a power of about 150 kW and a loop voltage of about 3 kV.

Figure 2:
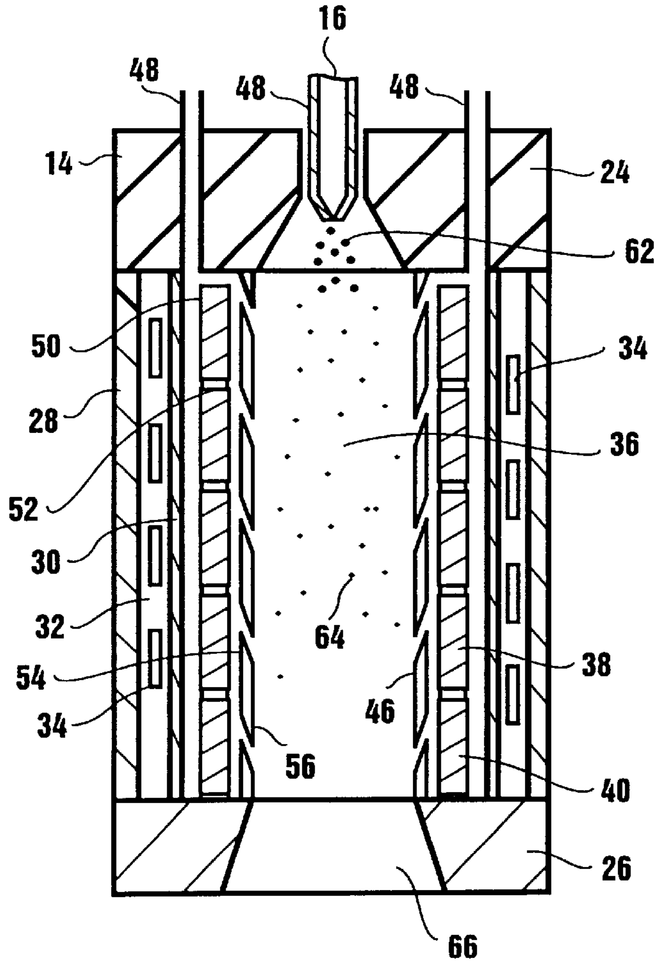
FIG. 2 is a cross sectional view of the ICP torch as seen along the line 2—2 in FIG. 1.

In detail, the construction of the torch 10 is perhaps best appreciated by cross referencing FIG. 1 with FIG. 2. When doing so, it can be seen that the body member 14 includes several specific components which are positioned between an upper end plate assembly 24 and a lower end plate assembly 26. These components include a cylindrical outer member 28 and a cylindrical inner member 30 which is coaxially positioned inside the outer member 28. A space 32 is thus established between the outer member 28 and the inner member 30 which serves as a water jacket for holding a fluid coolant. More specifically, the water jacket is used to cool an induction coil 34 which is positioned in the space 32. With this particular construction, it is preferable that the inner member 30 be made of quartz, or of some other electrically non-conductive material, so that the electromagnetic field which is generated by the induction coil 32 can radiate into the chamber 36.

Figure 3:
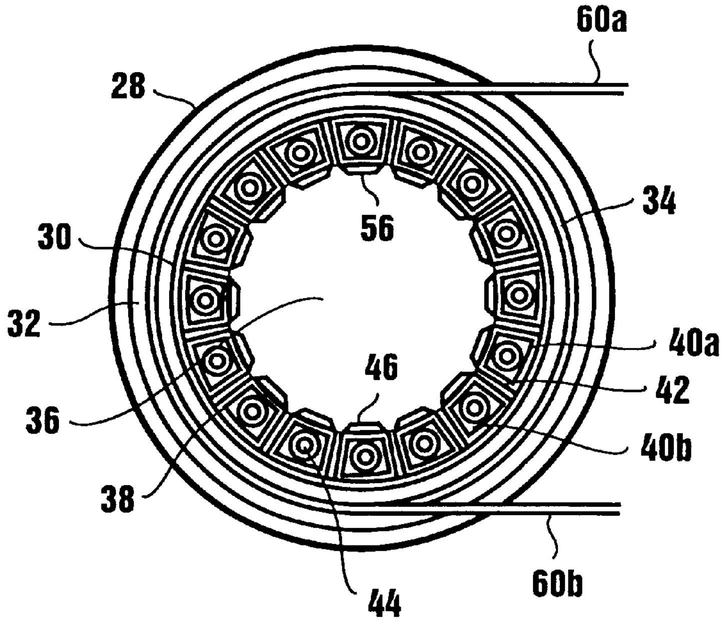
FIG. 3 is a cross sectional view of the ICP torch as seen along the line 3—3 in FIG. 1.

Between the inner member 30 and the chamber 36 of the torch 10 there is a segmented wall 38 which, in effect, is an extension of the inner member 30. Preferably, the segmented wall 38 is made of copper and, as shown by cross referencing FIG. 2 with FIG. 3, the wall 38 includes a plurality of elongated segments 40 which surround the chamber 36. Further, as shown in FIG. 3, there is a spacing plate 42 which is positioned between every pair of juxtaposed segments 40 (e.g. segments 40_a_ and 40_b_ in FIG. 3). Preferably, this spacing plate 42 is made of an electrically insulating material which will allow the electromagnetic field that is generated by the induction coil 34 to enter the chamber 36. Further, as seen in FIG. 3, each of the segments 40 is provided with an axial water channel 44 which will allow water to be pumped through the segment 40 for the purpose of helping to cool the segments 40 and also the inner member 30.

Still referring to FIG. 2 and FIG. 3, it will be seen that the segmented wall 38 includes a plurality of armor heat shields 46 which also help to cool the body member 14. Preferably the shields 46 are ceramic and made of a refractory material such as SiC, $Al_2O_3$, SiN, BN, or some other suitable material which can operate at high surface temperatures with minimal thermal stress. As intended for the present invention, the shields 46 can be mechanically attached to the copper segments 40 in any manner well known in the art, such as by brazing. Further, the geometry of the shields 46 is a matter of design preference and may include stress reliefs to reduce thermal stress. As contemplated by the present invention, during the operation of the torch 10, the surface temperature of the shields 46 will be around 1100° C.

Within the structure of the inner member 30 and the segmented wall 38 of the inner member 30, FIGS. 2 and 3 indicate there is a system of various fluid passageways which will transfer a cleaning gas from the source 20 into the chamber 36. Specifically, a feed 48 is provided to transfer a cleaning gas, such as a sodium vapor or a dry water vapor, from the source of cleaning gas 20 to the body member 14. As best seen in FIG. 2, the cleaning (shielding) gas first enters a primary fluid passageway 50 that is located inside the inner member 30 and next to the segmented wall 38. A plurality of cross fluid passageways 52 then pass the cleaning gas through the spacing plates 42, and between the segments 40, to the injection fluid passageways 54. The cleaning gas then enter the chamber 36 from the injection fluid passageways 54 and is directed from there to cover the inner wall 56 of the chamber 36. Additionally, it can be seen in FIG. 2 that the feed line 48 is also in fluid communication with the chamber 36 of torch 10 via a fluid passageway 58 which surrounds the nozzle 16. In each case, the purpose of the feed line 48 and the fluid passageways 50, 52, 54 and 58 is to provide a cleaning (shielding) gas which will cover the inner wall 56, and help protect the inner wall 56 from an unwanted build-up of deposits during the operation of the torch 10. For the purposes of the present invention, the flow rate of the cleaning (shielding) gas will be about seven liters per minute.

In the operation of the torch 10 of the present invention, a gas such as Argon is first used to initiate the reaction in chamber 36. Specifically, in order to initiate operation of the torch 10, RF power is generated inside the chamber 36. This is done by the generator 22, through its connections 60*a* and 60*b* with the induction coil 34. The Argon (or any other recycling gas) is then fed through the nozzle 16 into the chamber 36. The result is that the RF power atomizes the Argon gas in the chamber 36 to, thereby, heat the inner wall 56 of the chamber 36 to some nominal value. Next, the cleaning (shielding) gas is introduced into the chamber. Once the cleaning gas is being introduced into the chamber 36, the molten salt from source 12 can begin to be gradually fed into the chamber 36. The flow rate of molten salt through the nozzle 16 and into the chamber 36 continues to be gradually increased until it reaches an operational throughput flow of about one gallon per second. While the molten salt throughput is being increased, the injection of the Argon is gradually decreased until it is no longer necessary to inject the Argon. The injection of the cleaning (shielding) gas, however, is not changed and it continues throughout the operation of the torch 10.

As indicated earlier, when the molten salt is injected into the chamber 36, it is injected as droplets 62 (see FIG. 2) which have a diameter in a range of from fifty to one hundred microns. When they are initially injected, the droplets 62 will include both the volatile component and the refractory component of the molten salt. Shortly after being injected into the chamber 36, however, the volatile component of the droplets 62 is vaporized to create a working gas in the chamber 36. Within the working gas which results from the vaporization of the volatile component, temperatures and pressures in the chamber 36 are dramatically increased. In turn, these temperatures and pressures break down the refractory component of the molten salt. Specifically, this break down continues until the refractory components are distilled into fine droplets 64 (see FIG. 2) of molten oxides which will have diameters that are typically less than about one micron. At this point, heat loads of approximately 100 $MW/m^2$ can be generated on the fine droplets 64. As indicated above, such heat loads are sufficient for vaporization of even refractory materials. It is helpful to note that during the break down of the refractory component into the fine droplets 64, the fine droplets 64 are accelerated to a velocity of about 100 m/s by the pressures that result from vaporization of the volatile components. With these velocities, if the chamber 36 has a length of about 5 cm, the residence time of the fine droplets 64 in the chamber 36 will be about $5\times10^{-4}$ seconds. The $5\times10^{-4}$ seconds, although short, is sufficient for full evaporation of the residual refractory component in the fine droplets 64 before they leave the torch 10 through the exit aperture 66.

Figure 4:
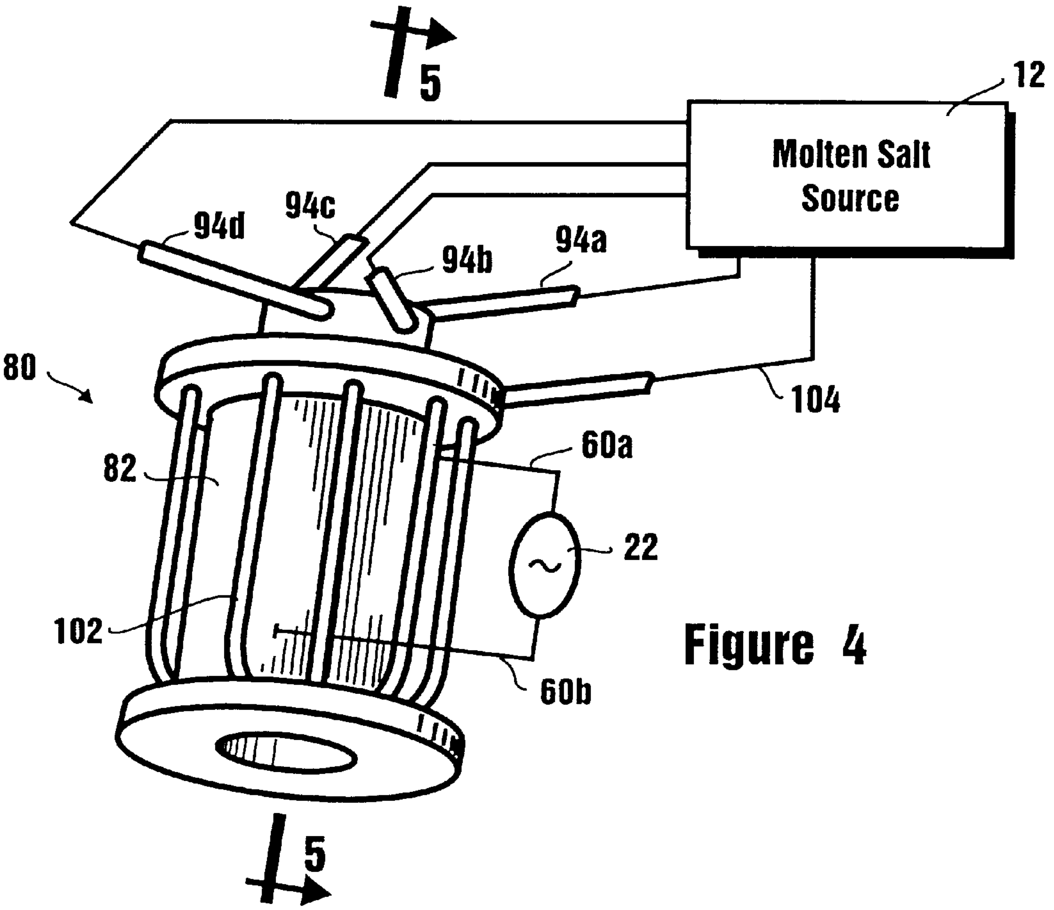
FIG. 4 is a perspective view of another embodiment of the ICP torch of the present invention, with the torch shown schematically in combination with peripheral components.

An alternate embodiment for the ICP torch of the present invention is shown in FIG. 4 and is generally designated 80. Insofar as the physics involved in the operation of torch 80 is concerned, the same phenomena described above in conjunction with the torch 10 apply equally to the torch 80. Namely, the molten salt is provided as droplets 62 which contain both a volatile component and a refractory component. The volatile component is first vaporized to create a working gas, and the working gas breaks down the refractory component into fine droplets 64. The fine droplets 64 are then also vaporized. With this in mind, the primary differences between the torch 80 and the torch 10 is the fact that for the torch 80, the molten salt itself is used for maintaining relatively lower operational temperatures on the structure of the torch 80. Recall, for the torch 10 the segmented wall 38 performed this function. Additionally, for the torch 80, the molten salt itself is used to shield the inner wall 56 from unwanted depositions. For the torch 10 this function was accomplished using the cleaning (shielding) gas.

Figure 5:
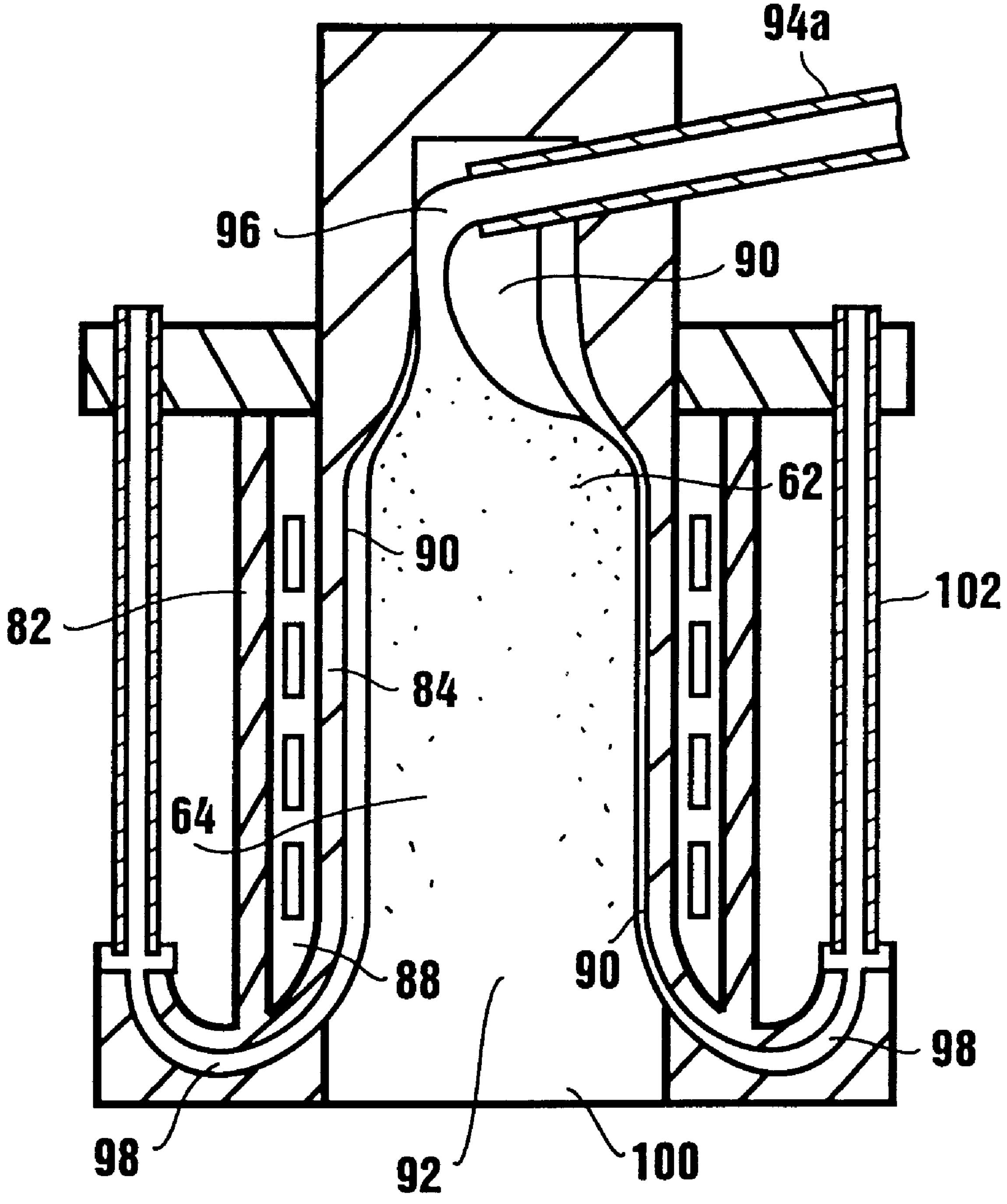
FIG. 5 is a cross sectional view of the ICP torch as seen along the line 5—5 in FIG. 4.

As best seen in FIG. 5, the torch 80 includes an outer cylindrical member 82 and an inner cylindrical member 84. The members 82 and 84 are coaxial and, as shown, they establish a space 86 between them for an induction coil 88. In a manner as described above with regard to the torch 10, the space 86 for torch 80 not only provides a position for the induction coil 88, it also establishes a water jacket for the induction coil 88. Further, it will be seen that the inner member 84 establishes an inner wall 90 that effectively defines the chamber 92 of torch 80.

Instead of using a nozzle 16 for injecting molten salt into the chamber 92, as is done for the chamber 36 of torch 10, the torch 80 uses a plurality of feed lines 94*a–d*. As indicated in FIG. 5, the feed lines 94, of which the feed line 94*a* is exemplary, will introduce the molten salt as a slurry 96 which is directed tangentially against the inner wall 90. Specifically, the slurry 96 is directed onto the inner wall with a tangential velocity that is in a range from about one-half to two meters per second ($V_\theta$=0.5 to 2 m/sec). The molten salt then swirls through the chamber 92 on the inner wall 90 as a thin film.

The operation of the torch 80 is initiated in a manner similar to that disclosed above for torch 10. Specifically, a noble gas, such as Argon, is used to heat the chamber 92. Once the chamber is heated, the throughput of molten salt is gradually increased until the Argon gas is no longer required. During the transit of the film of molten salt through the chamber 92, the heat that is inside the chamber 92 will cause the molten salt to boil off as droplets 62. As before, the volatile component of the droplets 62 then vaporize to break down the refractory component into fine droplets 64. The resultant fine droplets 64 of the refractory component, in turn, also vaporize. All of this occurs in the manner described above for the operation of torch 10. In the operation of the torch 80, however, there will be some residual molten salt film which, after passing through the chamber 92, will need to be recycled. This recycling is accomplished by using diverters (catchers) 98 which are positioned near the exit aperture 100 of the torch 80 to remove the molten salt film from the chamber 92. The molten salt is then transferred from the diverters (catchers) 100 via the return lines 102 and the conduit 104 to the source 12 of molten salt for recycling.

While the particular Induction Plasma Torch Liquid Waste Injector as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An inductively coupled plasma torch for vaporizing a molten salt containing a volatile component and a refractory component which comprises:

a substantially cylindrical shaped outer member defining an axis;

a substantially cylindrical shaped inner member coaxially positioned inside said outer member to establish a space for holding a fluid coolant therebetween, said inner member having an inner wall defining a chamber extending along said axis;

an induction coil, positioned in said space between said inner member and said outer member and submerged in said fluid coolant, for radiation of r.f. power into said chamber; and a means for injecting the molten salt into said chamber for direct interaction with said r.f. power to create a carrier gas of the volatile component during initial vaporization of the molten salt for subsequent use of the carrier gas in vaporizing the refractory component.

2. A plasma torch as recited in claim 1 wherein said means for injecting the molten salt comprises:

a nozzle for spraying droplets of the molten salt into said chamber; and a means for directing a cleaning gas over said inner wall of said inner member to inhibit deposition of material from the molten salt on said inner wall.

3. A plasma torch as recited in claim 2 wherein said inner member further comprises:

a plurality of elongated segments, each said segment being aligned substantially parallel to said axis and juxtaposed with two other said segments; and a plurality of spacing plates, with one spacing plate each being positioned between every two said juxtaposed segments.

4. A plasma torch as recited in claim 3 wherein each said segment is formed with a liquid coolant channel.

5. A plasma torch as recited in claim 3 further comprising at least one ceramic shield mounted on each said segment, said ceramic shield being positioned on said inner surface of said inner member to shield said inner member against condensation of the vaporized refractory component in the chamber.

6. A plasma torch as recited in claim 2 wherein said droplets of the molten salt have a diameter in a range of from fifty to one hundred microns (50–100 $\mu$m).

7. A plasma torch as recited in claim 2 wherein said cleaning gas is a sodium vapor.

8. A plasma torch as recited in claim 1 wherein said cleaning gas is water vapor.

9. A plasma torch as recited in claim 1 wherein said chamber has a first end and a second end and said means for injecting the molten salt comprises:

a jet positioned at said first end of said chamber for directing the molten salt onto said inner wall of said inner member to create a film of the molten salt thereon; and a diverter positioned at said second end of said chamber for receiving molten salt in said film from said inner wall and redirecting the molten salt to said jet for recycling.

10. A plasma torch as recited in claim 9 wherein said jet directs the molten salt substantially tangentially onto said inner wall to establish a tangential velocity ($v_\theta$) around said axis.

11. A plasma torch as recited in claim 10 wherein said tangential velocity is in a range from about one-half to two meters per second ($v_\theta$=0.5 to 2 m/sec).

12. A device for vaporizing a molten salt containing a volatile component and a refractory component which comprises of:

a means for Injecting the molten salt into a chamber, wherein said chamber is formed by a substantially cylindrical shaped outer member defining an axis and a substantially cylindrical shaped inner member coaxially positioned inside said outer member to establish a space for holding a fluid coolant therebetween, said inner member having an inner wall defining said chamber;

an induction coil for vaporizing said volatile component with r.f. power to create a carrier gas thereof in said chamber, said induction coil being positioned in said space between said inner member and said outer member and submerged in said fluid coolant; and a means for heating said refractory component with said carrier gas, under an increased vapor pressure from said carrier gas, to break down the refractory component of the molten salt into fine droplets, and for maintaining said fine droplets of the refractory component in said chamber for a predetermined period of time to vaporize said refractory components.

13. A device as recited in claim 12 wherein said means for injecting the molten salt comprises:

a nozzle for spraying droplets of the molten salt into said chamber; and a means for directing a cleaning gas over said inner wall of said inner member to inhibit deposition of material from the molten salt on said inner wall.

14. A device as recited in claim 12 wherein said means for injecting the molten salt comprises:

a jet positioned at a first end of said chamber for directing the molten salt onto said inner wall of said inner member to create a film of the molten salt thereon; and a diverter positioned at a second end of said chamber for receiving molten salt in said film from said inner wall and redirecting the molten salt to said jet for recycling.

* * * * *